(No Model.)
E. E. THOMAS.
SAWMILL CARRIAGE.
No. 523,156. Patented July 17, 1894.
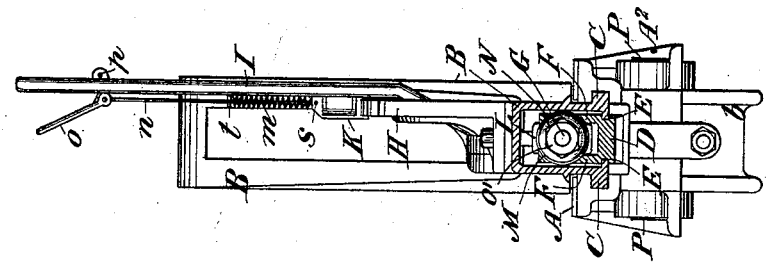
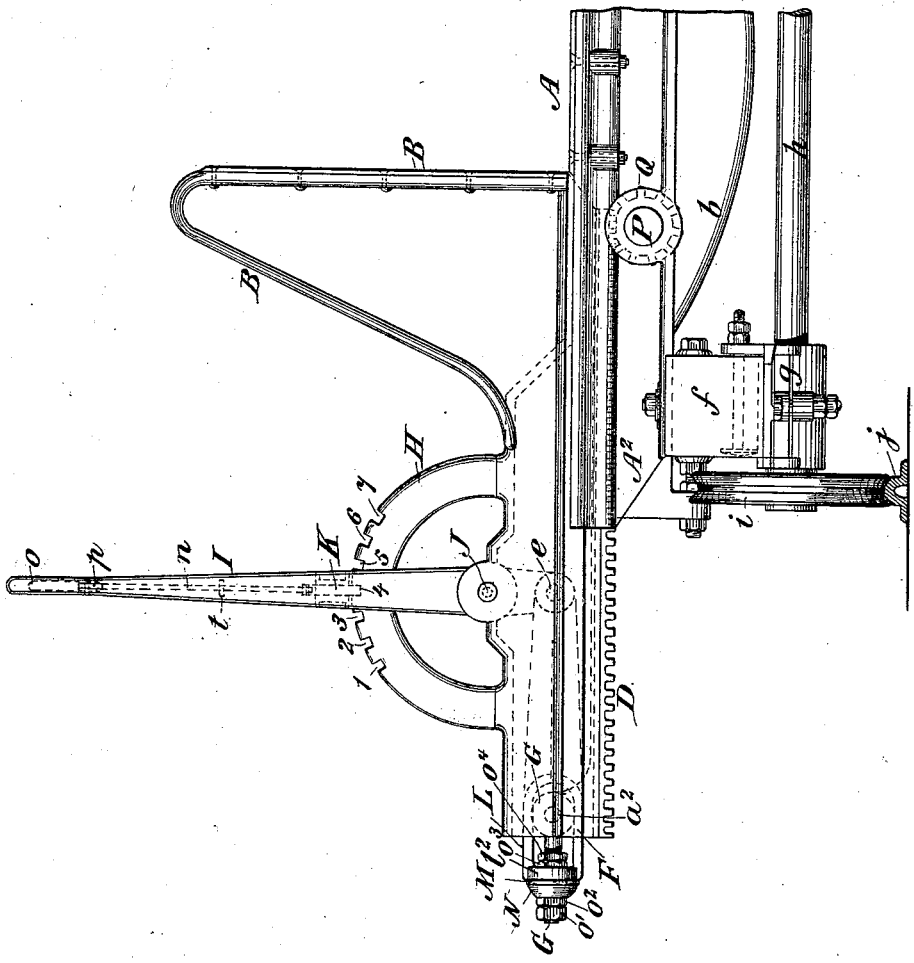
WITNESSES:—
D. N. Hayward
M. E. Foster
INVENTOR
E. E. Thomas
BY
J. N. McIntire
ATTORNEY

UNITED STATES PATENT OFFICE.

EDWIN E. THOMAS, OF BAY CITY, MICHIGAN, ASSIGNOR TO MICHAEL GARLAND, OF SAME PLACE.

SAWMILL-CARRIAGE.

SPECIFICATION forming part of Letters Patent No. 523,156, dated July 17, 1894.

Application filed April 12, 1894. Serial No. 507,234. (No model.)

*To all whom it may concern:*

Be it known that I, EDWIN E. THOMAS, of Bay City, in the county of Bay and State of Michigan, have invented a certain new and useful Improvement in Sawmill-Carriages; and I do hereby declare that the following is a full, clear, and exact description of the same, reference being had to the accompanying drawings, forming part of this specification.

My invention relates to saw mill carriages, and has for its main objects to improve this portion of a saw mill, by the embodiment therein of, first more efficient and desirable devices than those heretofore employed, to effect the adjustment, severally, of the knees, for the accommodation of more, or less, tapering logs; second, means for easily and perfectly affecting and maintaining a perfect alignment of the knees of the carriage; and, third, novel means for relieving the knees, and the rack and pinions by which they are actuated, from the injurious effects usually due to the concussive shocks to which the knees are often subjected in rolling logs on to the carriage, and for protecting the carriage against undue wear by blows from the steam nigger. And to these main ends my invention may be said to consist in the several novel combinations of devices, that will be found hereinafter fully described, and that will be most particularly pointed out in the claims of this specification.

To enable those skilled in the art to which my invention relates, to make and use saw mill carriages embracing, either wholly, or in part, the several features of improvement devised by me, I will now proceed to more fully describe the latter referring by letter to the accompanying drawings which form part of this specification, and in which I have shown a machine embodying all the said features of improvement, carried into effect in those precise forms in which I have, so far, successfully practiced them.

In the drawings, Figure 1 is a view showing, in end elevation, so much of a saw mill carriage, as is necessary to be delineated, in order to show all the parts of my invention. Fig. 2, is a view looking at the outer side of the carriage, but showing only one of the head-blocks thereof, with its accompanying knee, and the mechanism for adjusting the latter.

In both figures the same part will be found designated by the same reference letter or figure.

A is part of one of the series of head-blocks usually employed in a log-carriage, of any improved construction, the body-portion $A^2$, $b$ thereof, and the axle truck $h$, as well as head-block A, being broken away at Fig. 1 (leaving that part of the truck nearest to the saw unseen); in order to condense the drawings within prescribed limits, without making it on too small a scale.

$f$ is the longitudinal outer beam of the truck, to which are secured, as usual, the journal-boxes $g$, in which run the outer ends of the axles that each carry one of the peripherally grooved truck wheels $i$, that travel on the guide-rail $j$ of the ordinary track.

B is one of the knees (of which, it will be understood, there is, as usual in log-carriages, a series all alike) against the series, or set of which, the log rolled onto the head-blocks of the carriage, is placed in the well-known manner, and which knees, as usual, are severally, or separately, adjustable; for purposes well known.

The horizontal base or carriage-like, sliding, portion of the knee is formed, as shown (see Fig. 2) with longitudinal, projecting ways, C, C, which slide, or work within correspondingly shaped and sized grooves in the head-block A; while within the base-portion of said knee is arranged (to slide endwise relatively to the base of the knee and to a limited extent) the rack-bar D, the laterally arranged grooves in which engage with the inwardly projecting ways E, E, of the knee base; all as shown.

The teeth of the rack-bar engage, or mesh, as usual, with a pinion Q, keyed fast on the shaft P, which latter is manipulated in the well-known manner, to cause the simultaneous rotation of the series of pinions carried by it, for the purpose of driving the series of rack-bars, mounted one in each head-block A.

The outer end of the rack-bar D is formed, or provided, as shown, with two upwardly projecting lugs, or ears, F, F, and between these lugs is pivotally hung (on the pin $a^2$) the perforated end, or eye, of the eye-bolt G, the threaded portion of which extends outwardly (as best seen at Fig. 1); passing through the perforated disk-like device, or part $l^2$, of the link-bar L, and being provided with a series of four nuts, $o'$, $o^2$, $o^3$, and $o^4$; for a purpose to be presently explained.

N is a washer, or loose collar, strung on the threaded portion, or stem, of the eye-bolt G, and M is a rubber disk confined between said collar N, and the part $l^2$ of the link-bar, and adapted to perform the office, or function, of a spring cushion. The link-bar is yoked around the eye of bolt G, and, extending inwardly within the hollow base portion of the knee, has its inner end pivotally connected at $e$, to the lower end (and shorter arm) of the hand lever I, which, as seen, is fulcrumed on the stud, or pivot, J of the knee. This lever I has its longer, upwardly-projecting, arm provided with a longitudinal sliding latch-bolt, or detent, K, the lower end of which engages with notches 1, 2, 3, &c. in the peripheral surface, or edge, of a semi-circular bar, or segment, H, that is mounted fast on top of the base portion of the knee; and the said latch-bolt is provided with a common form of device, for conveniently operating it at the same time of manipulating the vibratory hand-lever I, which device comprises a pull-bar, or rod, $n$, connected at its lower end to the latch-bar, and at its upper end to a small angle-lever, or trigger $o$, pivoted at $p$ to a lug of the hand-lever; and a spiral spring $m$, acting expansively, arranged on the rod $n$, and intermediately of the upper end of the latch-bar, and a fixed lug, or stop $t$ (of the hand-lever), through which said rod slides.

The operations of the mechanism shown, and so far described, mostly with reference to the construction and arrangement together of the parts, will be easily understood from the following explanations read in connection with the drawings.

With the hand-lever I, in the condition seen at Fig. 1, and with the knee B, in its normal position, as shown, any necessary adjustment of the knee, to position it, on the head-block to suit the taper of a log (which operation is, I believe, usually called "adjusting the taper movement") is effected by taking hold of the upper end of the hand-lever I, and (at the same time properly manipulating the latch-bar K) moving said lever, either backward, or forward, to the requisite extent; such vibratory movement of the upper end of the lever I operating, through the connection of its lower end to the link-bar L, to cause the latter to act, according to the direction in which lever I be vibrated, either as a drawbar or a push-bar on the eye-bolt G (at the point on said bolt to which the part $l^2$ of the link L is confined on the bolt), and, as the eye-bolt is coupled at $a^2$ to the rack-bar D, the effect of this action of the link-bar L is (assuming the pinion Q and rack D to be for the time locked in place) a sliding of the base portion of the knee, in one, or the other, direction, to the requisite extent.

The rack-bar D, being locked in place relatively to the head-block, any enforced movement of the upper end of the lever L, must, of course, while its lower end is fulcrumed to the fixed link-bar L, operate to slide the knee B to which said lever I is pivotally connected at J. Thus by the simple and efficient means just above described, may what is called "adjusting the taper movement" of the carriage be easily accomplished with perfect precision.

Whenever the knees B of the carriage get out of perfect alignment (while in their working position) they are easily set perfectly in line again by simply manipulating the two sets of adjusting and jam nuts $o'$, $o^2$, $o^3$, and $o^4$, by means of which (when the hand-lever I, and knee B are locked together) the link-bar L may be moved, or adjusted, endwise, relatively to the rack-bar D, to which the eye-bolt G is coupled; the said rack-bar being supposed to be locked in place, for the time being, relatively to the head-block A. Thus, by the simple adjustment of these nuts on the stem of bolt G, may the knee B be perfectly adjusted, in the organism herein shown and described; and this structural feature of my improved machine, I consider an important part of my invention.

Another very important and advantageous feature of my improved machine lies in the very simple and efficient means I have devised for cushioning all the shocks or blows, to which the knees may be subjected, which means consist in the hereinbefore described rubber cushion, or disk M confined between the washer N, and the disk-like part $l^2$ of the link-bar L. As these parts N and $l^2$ are arranged between the nuts $o^2$ and $o^3$ of the bolt G, that is, coupled, as before explained, to the lugs F, of the rack-bar D, it follows that with said rack-bar and its pinion Q locked in place, relatively to the head-block, A, any sudden blow against the working face of the knee B, will, instead of imparting its injurious shock, or concussive effect, to the gear teeth, and other rigid parts of the mechanism, have such shock dissipated in, or taken up by, the rubber cushion, or elastic pad, M; to the great relief of the rigid metallic parts of the carriage mechanism. It will be observed that by the simple means of this cushion M, applied to a device arranged exteriorly of the knee base and rack-bar, and operating as explained, I provide a perfect preventive to all injurious shocks and strains on the gear mechanism, and other working parts of the carriage mechanism.

Having now so fully described my improvements that any one skilled in the art can make and use sawmill-carriages embracing them, and wishing it to be understood that, although the machine herein shown and described comprises all the features or parts of my invention, said features, where capable of use separately, may be so used with advantage, what I claim as new, and desire to secure by Letters Patent, is—

1. In a saw mill carriage, the combination, with the head-block; a rack-bar arranged therein; and a pinion meshing with the teeth of said rack-bar, about as usual, of a knee adapted to move longitudinally on said rack-bar; an eye-bolt coupled to the outer end of said rack-bar; an actuating hand-lever fulcrumed on the knee base; and a link pivotally connected at one end to the lower end of said hand-lever, and at its other end coupled to said eye-bolt; substantially as and for the purpose set forth.

2. In a saw-mill carriage, the combination with the knee; and its rack-bar, of a bolt pivotally connected to said rack-bar; a link-bar coupling said bolt to the knee; and means for adjusting the said link-bar on the said bolt; whereby the knee may be adjusted on the head-block of the carriage, substantially as and for the purpose set forth.

3. In a saw mill carriage, the combination, with the knee; the rack-bar; the eye-bolt; and a link-bar coupling the latter to the knee, of a cushioning device, arranged intermediately of the coupled part of said eye-bolt and said link-bar, and operating to absorb, or dissipate, any sudden shocks to which the knee may be subjected, and thus relieve the geared parts of the mechanism from the injurious effects thereof; as set forth.

In witness whereof I have hereunto set my hand.

EDWIN E. THOMAS.

In presence of—
ALFRED B. LENNOX,
RICHARD A. McKAY.